United States Patent [19]

Culler et al.

[11] Patent Number: 4,837,678
[45] Date of Patent: Jun. 6, 1989

[54] INSTRUCTION SEQUENCER FOR PARALLEL OPERATION OF FUNCTIONAL UNITS

[76] Inventors: Glen J. Culler, 608 Litchfield, Santa Barbara, Calif. 93105; Robert B. Pearson, 6457 Camino Viviente, Goleta, Calif. 93117; Michael McCammon, 683 Catania Way, Santa Barbara, Calif. 93105; William L. Proctor, 6641 Del Playa, Goleta, Calif. 93117; John L. Richardson, 5561 Huntington Dr., Santa Barbara, Calif. 93111

[21] Appl. No.: 35,349

[22] Filed: Apr. 7, 1987

[51] Int. Cl.⁴ .............................................. G06F 9/22
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,234,523 | 2/1966 | Blixt et al. | 364/200 |
| 3,346,851 | 10/1967 | Thornton et al. | 364/200 |
| 3,771,141 | 11/1973 | Culler | 364/200 |
| 4,051,551 | 9/1977 | Lawrie | 364/200 |
| 4,287,566 | 9/1981 | Culler | 364/200 |
| 4,541,048 | 9/1985 | Propster et al. | 364/200 |
| 4,604,695 | 8/1986 | Wider et al. | 364/200 |
| 4,722,049 | 1/1988 | Lahti | 364/200 |

*Primary Examiner*—David Y. Eng
*Attorney, Agent, or Firm*—Freilich, Hornbaker, Rosen & Fernandez

[57] ABSTRACT

An instruction sequencer for programming parallel operations of functional units in response to an instruction stream is shown. The instruction sequencer includes a random access memory for storing instruction segments which program the operations of the functional units. An instruction address register contains instruction addresses for selected locations in the memory having instruction segments stored therein. A memory address circuit reads out an instruction stream comprising instruction segments from the memory in response to the stored instruction address and stores the same in an instruction buffer register. A rotating network, which is operatively coupled to the instruction buffer register, rotates the instruction stream so as to position a selected instruction segment at a predetermined location in a rotating network. A control circuit determines whether the rotating network is required to rotate the instruction stream and, if so, directs the rotating network to position the selected instruction segment at the predetermined location in the rotating network. A first decoding circuit receives and decodes the selected instruction segment to produce a first control signal. A shifting circuit receives the rotated instruction stream and shifts the same an amount equal to at least the width of the selected instruction segment and then applies the same to a second decoding circuit which produces a second control signal. The first and second control signals are adapted to be applied to and commence operation of the functional units in parallel.

20 Claims, 2 Drawing Sheets

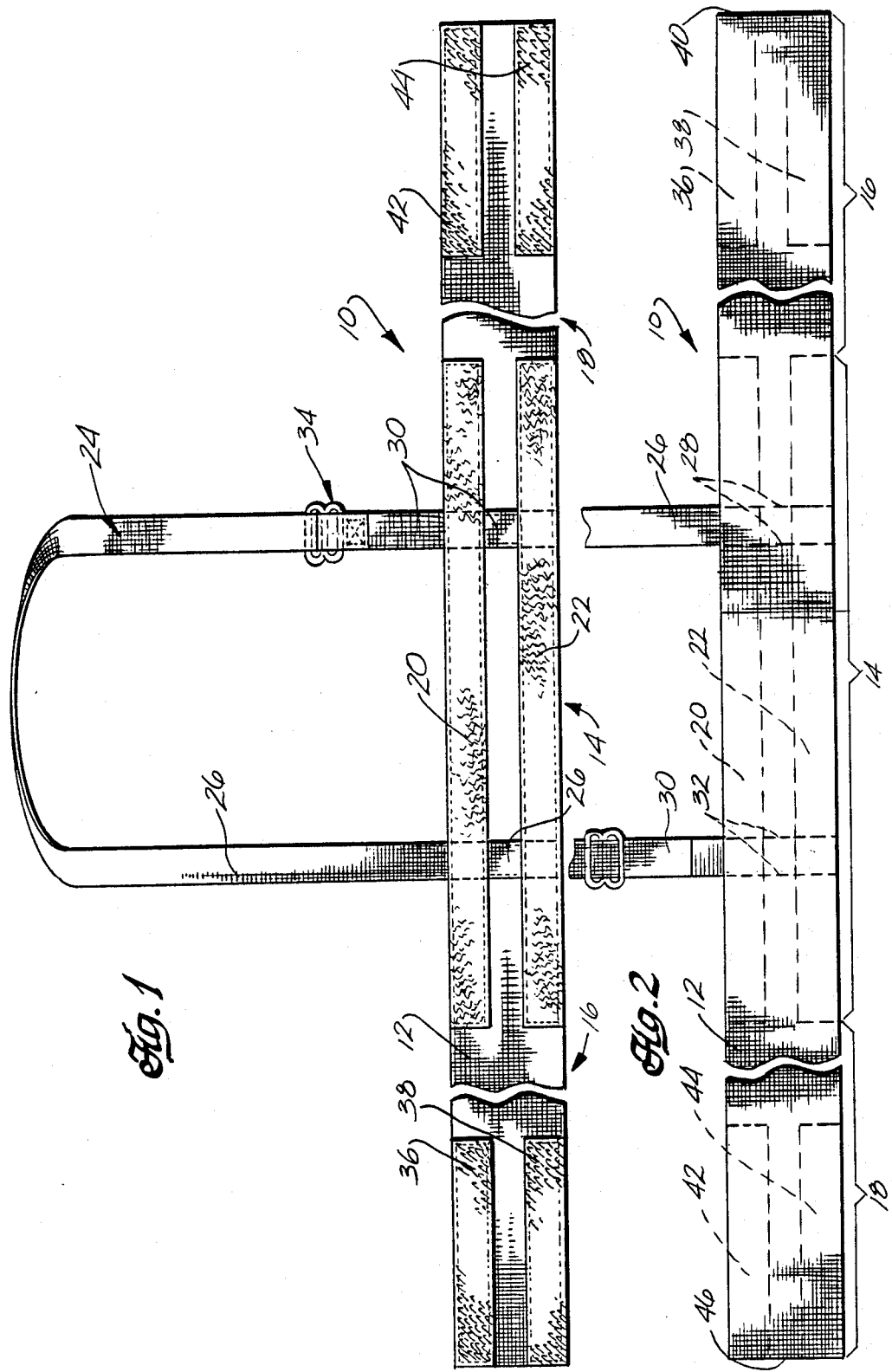

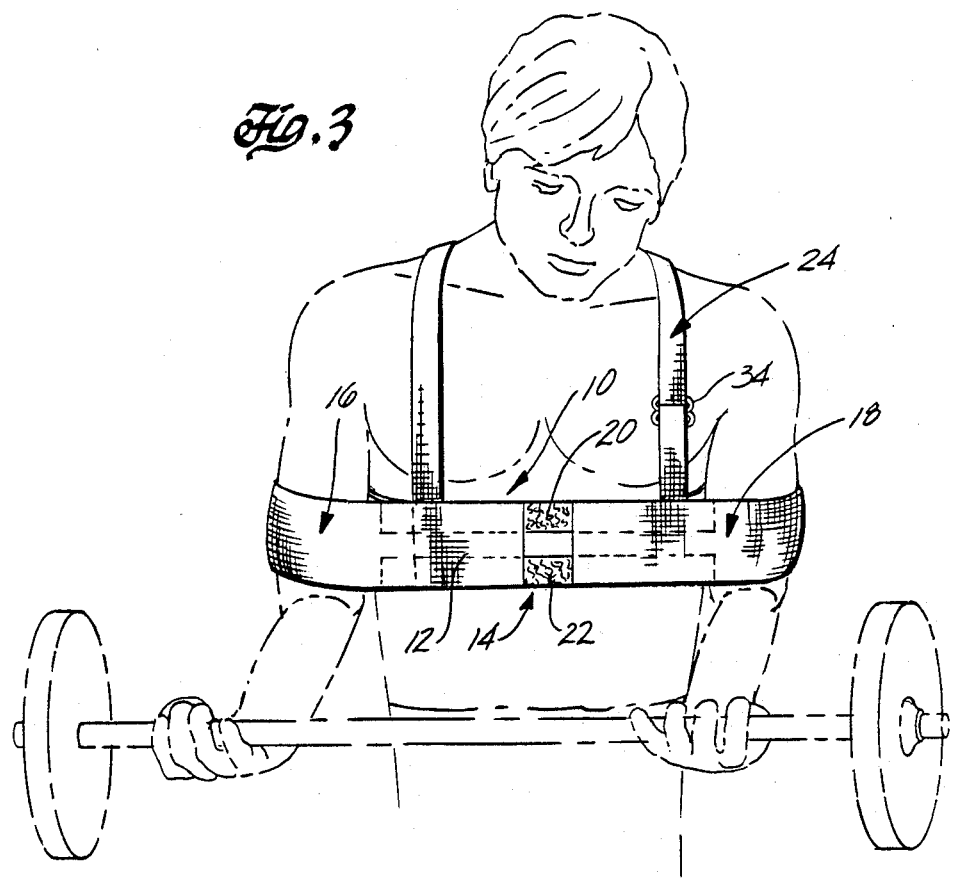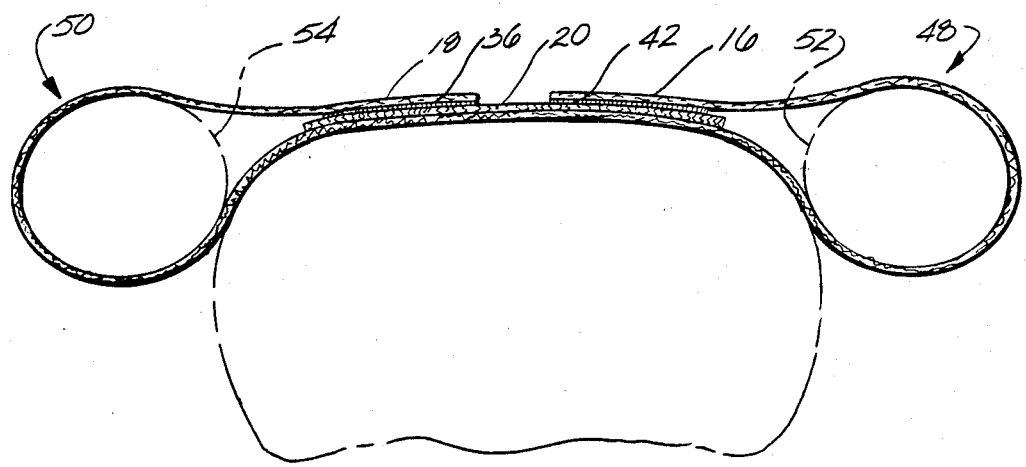

INSTRUCTION SEQUENCER FOR PARALLEL OPERATION OF FUNCTIONAL UNITS

BACKGROUND OF THE INVENTION

1. Field of the Invention

This invention relates to an instruction sequencer for use in a data processing systems which includes a plurality of functional units which are capable of being operated in parallel and more specifically to an instruction sequencer adapted for use in a data processing system having a plurality of functional units wherein the instruction sequencer programs parallel operations of the plurality of functional units in response to an instruction stream read out of a random access memory.

2. Description of the Prior Art

It is known in the art for a data processing system to execute an instruction using two or more functional units operating in parallel such as, for example, simultaneously executing a multiplication, addition, shift, or the like.

One well known, high-speed scientific digital computer which utilizes parallel processing in combination with a preprocessing stage and instruction reservation system is described in U.S. Pat. No. 3,346,851. Specifically, U.S. Pat. No. 3,346,851 discloses and teaches a digital computer central processor having a plurality of arithmetic or functional units and a scoreboard for instruction control which enables simultaneous execution of a plurality of instructions from a single program. In operation, the digital computer central processor disclosed in U.S. Pat. No. 3,346,851 includes means for controlling, in an orderly sequence, simultaneous operations of functional units in a high-speed digital computer wherein each functional unit is responsive to a specific instruction which is one of many instructions from a single program. This is accomplished by means of a reservation system which allows instructions to be issued to functional units for execution in the order prescribed by the programmed sequence. The control system allows the processing of instructions in parallel while maintaining instruction reservations which, in cooperation with the scoreboard, maintain a high degree of continuous simultaneous operation of all the functional units. The scoreboard permits the numerical operations and results from a specific functional unit to be reserved for use by the parallel functional unit upon completion of the operation of the functional unit which is to generate the numerical result reserved for a subsequent functional unit.

In the digital computer control processor of U.S. Pat. No. 3,346,851, different specific instructions are required for each functional unit and the control section cooperates with the scoreboard portion of the digital computer central processor to ultimately program the operation of the specific functional unit and utilizes the reservation system as the means for identifying a portion of the numerical data required for the numerical operation to be performed by that functional unit. This enables all functional units to operate at the highest possible efficiency for both deterministic and nondeterministic applications.

U.S. Pat. No. 3,234,523 discloses and teaches a program execution means for a stored program data processing system which utilizes discrete instruction words having a command portion which is divided into a plurality of sub-units designated as fields, each of which is capable of containing a value which controls a single operation such as a transfer, transfer with shift, add, subtract, or the like. Each of the fields is scanned during a different time phase of the execution. The instruction word contains a specific value for each field each field value is independent from one another enabling each field to be scanned at a different time. Also, U.S. Pat. No. 3,234,523 discloses the use of a decoder and command generator which is responsive to each field of the divided instruction word format to generate command signals for executing the operation specified by the single instruction word.

It is also known in the art to utilize parallel operation of functional units in high-speed specialized computers such as, for example, array processors or vector processors. Typical of such systems are those disclosed in U.S. Pat. Nos. 3,771,141; 4,287,566; and 4,051,551.

U.S. Pat. Nos. 4,287,566 and 3,771,141, wherein the inventor thereof is one of the coinventors herein, disclose the use of array processors wherein parallel operations in terms of arithmetic and data transfer operations are executed in parallel in clock cycles in response to a single instruction drawn from an instruction memory.

U.S. Pat. No. 4,287,566 discloses the use of an array processor for performing calculations utilizing data from two distinct two-dimensional arrays wherein the array processor incorporates multiplication, addition, subtraction, transfer and storage means. The arithmetic and storage operations and the two-dimensional array axis operations can be connected in parallel. Other known array processors operate in a similar manner as that described in U.S. Pat. No. 4,287,566.

U.S. Pat. No. 3,771,141 discloses and teaches an array processor wherein parallel operation of functional units is achieved as a consequence of implementing internal data registers and arithmetic circuits with multiple data inputs and by controlling the same in response to a particular instruction format. Specifically, instructions are stored in an instruction buffer and are drawn one at a time from a high-speed internal instruction memory which, in turn, is normally loaded, one instruction block at a time, from a core memory. The instruction format includes multiple fields which separately identify operands to be executed in parallel. In operation, instructions are read, one at a time, from an instruction pad which, in turn, is loaded from a large core memory. The instructions from the instruction pad include a plurality of fields of information. The control and timing units are responsive to the specific fields of the instruction and perform the operations in response to the specific instruction fields contained within the instruction word. When that instruction word operation has been completed, a new instruction word is then fetched from the instruction pad and the process is repeated. The array processor is capable of responding to specific fields within the single instruction word to provide parallel operations of two or more functional units in order to obtain the high processing speeds associated with data processors having parallel operations per instruction word.

U.S. Pat. No. 4,051,551 discloses a multidimension, parallel access computer memory system which includes a plurality of memory modules and a plurality of processors which are responsive to indexing tags which align a particular processor with a particular memory. The indexing tabs are generated at two different time frames and are operative to determine which data is to be read from a memory address and applied to a specific processor for processing. When the processing is completed, index tags are generated to return the processed data to a particular memory address. The parallel operation is achieved by matching various memory addresses and particular processors together with use of data buffering to interface data flow through multiplexes in order to obtain high processing speeds while permitting orderly processing and storage of data.

The concept of using an instruction stream having a plurality of instruction segments wherein blocks of the instruction stream are continually processed by an instruction sequencer to control on a continuous basis one, two or more functional units is not disclosed, suggested or taught by the known prior art.

SUMMARY OF THE PRESENT INVENTION

The present invention discloses a novel, unique and improved multiunit instruction sequencer which is capable of programming parallel operations of a plurality of functional units in response to an instruction stream. The instruction sequencer specifically includes a memory means for storing at selected locations in the memory means a plurality of instruction segments for programming operations of at least two of the plurality of functional units. An instruction address register is adapted to receive and store instruction addresses for selected locations in the memory means. A memory addressing means is operatively coupled to the memory means and to the instruction address register. The memory addressing means is responsive to instruction addresses loaded in the address register for reading out instruction segments from address selected locations in the memory to assemble an instruction. The assembled instruction stream comprises instruction segments from the addressed locations in the memory means. The instruction segments are used for programming operations of at least two of the plurality of functional units. The instruction stream is applied to an instruction buffer register which is operatively coupled to the memory means for receiving and storing the instruction stream from the memory means. The use of an instruction address register and an instruction buffer register provides a means for enabling the instruction address register to address the memory addressing means for reading out of the instruction stream from memory and for storing the instruction stream in the instruction buffer register in a single clock cycle.

A rotating network means is operatively coupled to the instruction buffer register for rotating the instruction stream to position a selected instruction segment of the instruction stream at a predetermined location in the rotating network means. The rotating network means includes output means for transferring as an output therefrom the rotated instruction stream.

A control means which includes a staging register is adapted to be loaded with an address designating the location of the selected instruction segment in the instruction stream and whether the next successive instruction segment is to be executed by a predetermined one of the plurality of functional units. The control means further includes means for determining the width of the selected instruction segment. The control means is operatively coupled to the instruction buffer register and to the rotating network means for enabling the rotating network means to be responsive to the staging register to rotate the instruction stream as required to position the selected instruction segment at a predetermined location in the rotating network means.

A first decoding means is operatively coupled to the rotating network means output means for decoding the selected instruction segment to produce a first control signal which is adapted to be applied to and commence operation of a predetermined one of the plurality of functional units. In the preferred embodiment, the first control signal is stored in a first control register. A shifting means is operatively coupled to the rotating network means output means and to the control means for enabling the shifting means to shift the rotated instruction stream at least the width of the selected instruction segment to position the beginning of a successive instruction segment for another of the plurality of functional units at a predetermined location within the shifting means.

A second decoding means is operatively coupled to the shifting means for decoding the shifted, rotated instruction stream to produce a second control signal which is adapted to be applied to and commence operation of another of the plurality of functional units in parallel with the operation of the predetermined one of the plurality of functional units.

One of the disadvantages of the prior art data processing systems and array processor systems, which utilize functional units operating in parallel in response to an instruction word, is that each of the control and command units functions on receiving a specific instruction word of a predetermined bit length wherein the instruction word is in a specified format. Specifically, in the prior art systems, decoding means and generating means are responsive to selected portions of an instruction word, such as instruction fields, addressing tags, memory tags, or the like, in order to execute parallel operations o two or more functional units. When the instruction word has been executed, it is necessary for the instruction pad memory or source of instructions to be accessed to fetch a new instruction word, whereupon the process is repeated to execute the new instruction word.

One advantage of the present invention is that the instruction sequencer is operative in cooperation with a high-speed, programmable random access memory wherein instruction segments can be stored in the memory means at selected locations. An instruction address register is operatively coupled to the memory means and, under programmed control, the instruction address register specifically assembles a continuous instruction stream comprising a plurality of instruction segments which are read out of the memory means in response to the instruction addresses stored in the instruction address register. In this manner, a continuous instruction stream containing instruction segments which are capable of operating two or more functional units in parallel are generated as an output from the main memory and applied t an instruction buffer register permitting clocked operations. Also, the instruction stream is rotated, shifted, and decoded in parallel during a single clock cycle such that the next portion of the instruction stream is staged to be loaded into the instruction buffer register so that it can be rotated, shifted, and decoded in the next clock cycle.

Thus, one advantage of the present invention is that the instructions sequencer can program parallel operations of a plurality of functional units in response to an instruction stream.

Another advantage of the present invention is that the instruction segments can be preloaded into a programmable random access memory by a data bus while instruction addresses can be loaded into the instruction address register by a staging bus and the loading can occur in parallel. The instruction addressing register is capable of continuously reading out instruction segments to assemble an instruction stream wherein a block thereof having a predetermined bit length such as, for example, a block having 128 bits, is loaded into an instruction buffer register, enabling the rotation, decoding and shifting to be clocked operations, but wherein the instruction stream is continuous.

Another advantage of the present invention is that the instructions can be read from a random access memory and loaded into an instruction buffer register in a first clock cycle, the instruction stream stored in the instruction buffer register can be rotated, shifted, and decoded and loaded into control registers in a second clock cycle, and the control signals are stored in control registers which enable the functional units to execute the control signals in parallel in a third clock cycle.

A further advantage of the present invention is that the operations between registers can be initiated in response to a clock cycle, and the results thereof loaded into a subsequent register prior to the initiation of the next successive clock cycle. Thus, each clock cycle ensures that clocked operations are commenced simultaneously from each register and that the loading of registers by the various operating components is accomplished by the components between registers operating at asynchronous, high-speed rates which are less than a clock cycle such that a selected register is loaded prior to commencement of the next clock cycle.

A still further advantage of the present invention is that the instruction address register is utilized in combination with a translation means which converts the instruction address into memory addressing signals for addressing selected locations in the programmed, random access memory and for reading out a block of an instruction stream, including a plurality of instruction segments, which is stored in an instruction buffer register for clocked operations.

Another advantage of the present invention is that the instruction format can be arranged such that the two successive instruction segments can be programmed to a predetermined one of the functional units or, in the alternative, a leading instruction segment is programmed to a predetermined one of the plurality of functional units while the trailing instruction segment is programmed to another of the plurality of functional units, enabling both the predetermined one and another of the plurality of functional units to be operated in parallel.

A further advantage of the present invention is that the instruction address register can be utilized in cooperation a virtual memory for translating the instruction address register information into addressing signals for reading out in parallel a block of the instruction stream stored at a plurality of selected memory locations from a high-speed, programmed random access memory. Another advantage of the present invention is that the instruction sequencer can concurrently decode a selected instruction segment from the rotated instruction stream to generate a control signal for a predetermined one of the plurality of functional units while applying the same rotated instruction stream to a shift register which is capable of shifting the instruction stream a number of bits which is at least equal to the width of the selected instruction to position a different instruction segment for another of the plurality of functional units at a predetermined location in the shift register. The shift register performs the function of positioning the shifted, rotated instruction stream such that a trailing instruction segment in the instruction stream can be decoded and a second control signal developed therefrom is loaded into a control register which can be clocked for execution by another of the plurality of functional units in parallel with clocking of the control register storing a first control signal for a predetermined one of the plurality of functional units generated in response to the selected instruction segment.

A yet further advantage of the present invention is that the instruction sequencer can be utilized with a user processor which has an operational processor and a math processing section, each of which are capable of performing arithmetic operations. Parallel operations of the operational processor and the math processor can be performed by the user processor under control of the multiunit instruction sequencer. The operational processor and math processor are responsive to a control signal to perform the arithmetic operation or calculation. The user processor having the instruction sequencer can be utilized as one of a plurality of application processors in a data processing system which is controlled by an operating system processor and a system controller which enables parallel loading of data and addresses from a system data bus and a staging data bus into the user processor.

A still further advantage of the present invention is that a method for generating an instruction stream and for rotating the instruction stream in a rotating network means and decoding the same with a first decoding means to produce a first control signal which is capable of being stored in a first control register and for shifting the rotated instruction stream with a shifting means and for decoding the shifted, rotated instruction stream with a second decoding means for producing a second control signal which is stored in a second control register is provided.

BRIEF DESCRIPTION OF THE DRAWINGS

These and other advantages of the present invention, together with its various features, can be more easily understood based upon a more detailed description of the preferred embodiment taken in conjunction with the drawing which includes the following figures:

FIG. 5 is a pictorial representation of a format of an instruction segment, having an operation portion and an extension portion, which is capable of operating another of the plurality of functional units which is generally referred to herein as the A-machine instruction format;

FIG. 6(A) is a pictorial representation of two instruction segments of an instruction stream, each of which is designated as being in the XY-machine instruction format;

FIG. 6(B) is a pictorial representation of two instruction segments of an instruction stream wherein the leading instruction segment is utilized for programming operation of an XY machine and the trailing instruction segment is utilized for programming the operation of an A machine;

FIG. 7 is a block diagram illustrating the operation of the instruction sequencer which produces control signals decoded from instruction segments for the XY machine and the A machine;

DESCRIPTION OF THE PREFERRED EMBODIMENT

Figure 1:
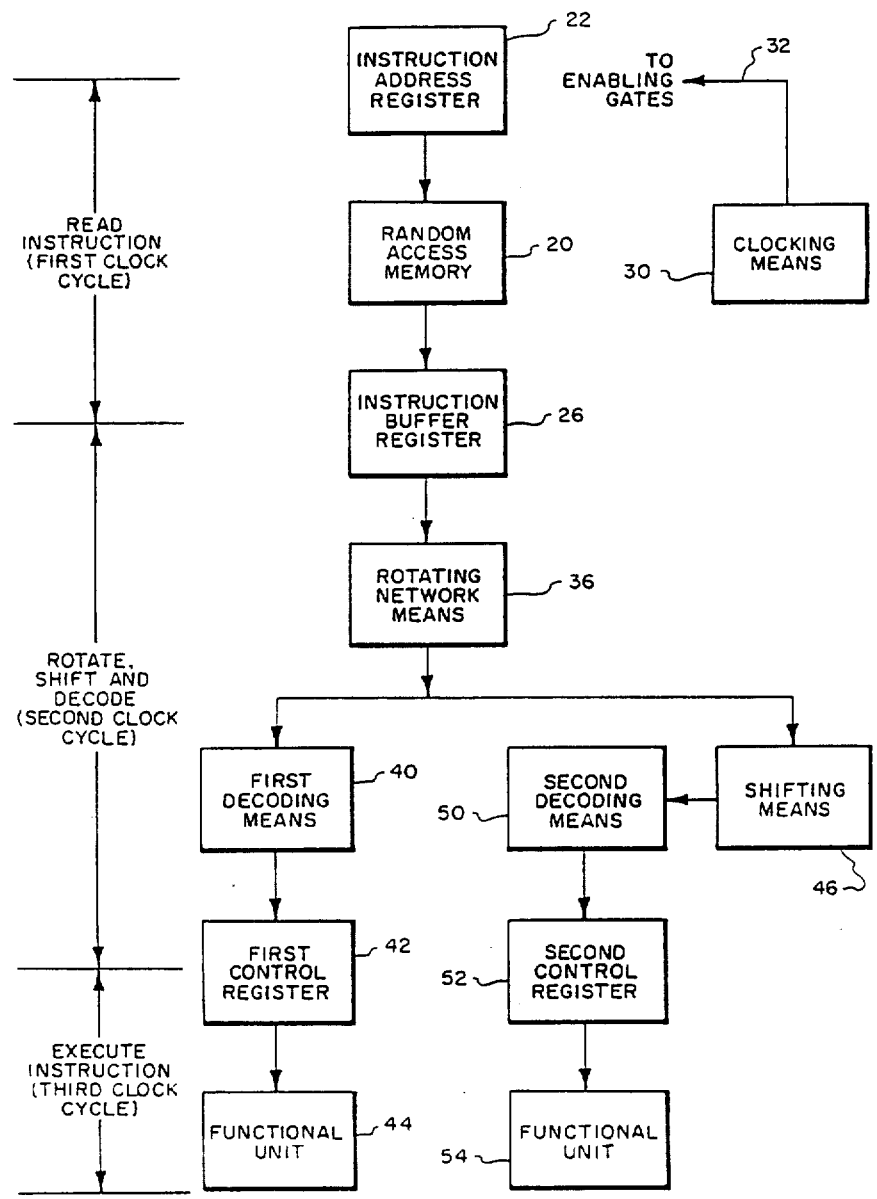
FIG. 1 is a block diagram illustrating the basic components of an instruction sequencer and the operations performed during each clock cycle.

The block diagram of FIG. 1 illustrates the operation of an instruction sequencer in the preferred embodiment for programming parallel operations of a plurality of functional units in response to an instruction stream. The instruction sequencer includes a memory means such as, for example, a random access memory 20 which is the programmed source of the instruction stream and which is utilized for storing a plurality of instruction segments for programming operations of two or more functional units. Instruction segments are preloaded into selected locations of the random access memory 20, which locations are capable of being addressed by a memory addressing means in terms of a column and row coincidence matrix addressing means. An instruction address register 22 is adapted to receive and store instruction addresses for specific instruction segments which are stored at selected locations in the random access memory 20. Typically, the instruction address register 22 is preloaded with instruction addresses. The instruction address register 22 applies the address signals stored therein to a translation means such as, for example, a virtual memory having page tables wherein the instruction addresses clocked out of the instruction address register are converted into addressing signals utilized by memory addressing means to address selected instruction segments having predetermined bit lengths located at specific locations within the random access memory 20. The random access memory 20 is responsive to the memory addressing means programmed by the instruction address register 22 to assemble a block of an instruction stream, having a predetermined bit length, therefrom which comprises a plurality of instruction segments which are stored at selected locations in the random access memory 20. In the preferred embodiment, the instruction stream is read out of the random access memory 20 in a block having a 128-bit length and the block is stored in instruction buffer register 26.

As illustrated in FIG. 1, the random access memory 20 is a high-speed random access memory and the instruction address register 22 is capable of translating the instruction addresses for reading out a block of the instruction stream from the random access memory and storing the same in instruction buffer register 26 in a single clock cycle. This is generally referred to as the read instruction clock cycle.

The operation of the instruction address register 22 including its translation means, the operation of the random access memory 20, and the cycle times thereof are substantially less than a single clock cycle of a clocking means 30, the output 32 of which is applied to a plurality of enabling gates to enable clocked operations of the application processor, the multiunit instruction sequencer, as well as all registers thereof.

In FIG. 1, the output of the instruction buffer register 26 is applied to a rotating network means 36 which rotates the instruction stream a predetermined number of bits, the width of which is determined by a separate control means which determines the bit length of a selected instruction segment. The rotated instruction stream places a selected instruction segment which is directed to a predetermined one of the plurality of functional units such as, for example, the XY machine, in the left-most position of the rotating network means, effectively designating that instruction segment as the XY machine instruction segment. The width of the XY machine instruction segment is determined by a control means, and the selected instruction format located at the predetermined location in the rotating network means 36 is applied to a first decoding means 40. The first decoding means 40 decodes the XY machine instruction segment and generates a first control signal which is applied to a first control register 42. The first control signal is capable of programming the predetermined one of the plurality of functional units, or in this case the XY machine, to execute an operation.

An output means of the rotating network means 36 concurrently applies the rotated instruction stream to a shifting means 46 which is responsive to a control means to shift the instruction stream a number of bits which is equal to the bit width of the selected instruction segment which was applied to the first decoding means 40. The shifted, rotated instruction stream, which contains the next successive instruction segment, positions the next instruction segment in the left-most position in the shifting means 46. The shifting means 46 then applies the same to a second decoding means 50 which decodes the shifted, rotated instruction stream to produce a second control signal which is applied to a second control register 52. The second control signal stored in the second control register 52 is capable of being applied to another of the plurality of functional units 54 such as, for example, an A machine, to commence operation of the functional unit 54 in parallel with the functional unit 44.

As is illustrated in FIG. 1, the transfer of the instruction stream from the instruction buffer register 26 to the level where the instruction stream has been rotated, shifted and decoded and stored as control signals in the control registers 42 and 52 occurs in a second clock cycle. Thus, the time required to perform the rotation, shifting and decoding is substantially less than a single clock cycle such that the decoded first and second control signals are stored in control registers 42 and 52 at the end of a second clock cycle. The execute instruction operation which occurs in the third clock cycle enables the control signals to be applied in parallel to its associated functional unit, enabling both of the functional units to execute math operations in parallel from the same instruction stream.

Figure 2:
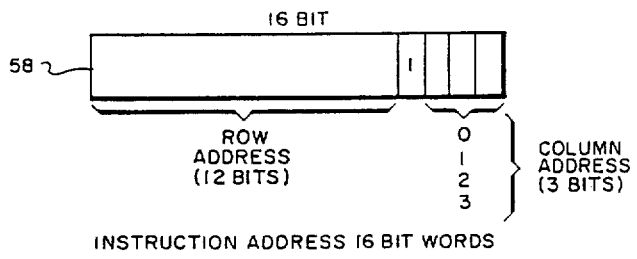
FIG. 2 is a pictorial representation of an instruction address comprising a 16-bit word format for addressing a row and column of a programmable random access memory.

FIG. 2 illustrates an instruction address 58 which is stored in the instruction address register 22 of FIG. 1. The instruction address 58, in the preferred embodiment, includes 16 bits of information wherein the first 12 bits are utilized to designate a row address within the programmable random access memory 20, the 13th bit is a separation bit, and the last 3 bits are utilized to determine the column address within the programmable random access memory 20. Thus, each instruction address is capable of designating a selected location in a memory means, and the memory addressing means is responsive to the specific instruction address to retrieve the stored instruction segment in the form of a block of data from the memory means which block of data is used to assemble the instruction stream within an instruction buffer register, such as an instruction buffer register 110 in FIG. 3.

Figure 3:
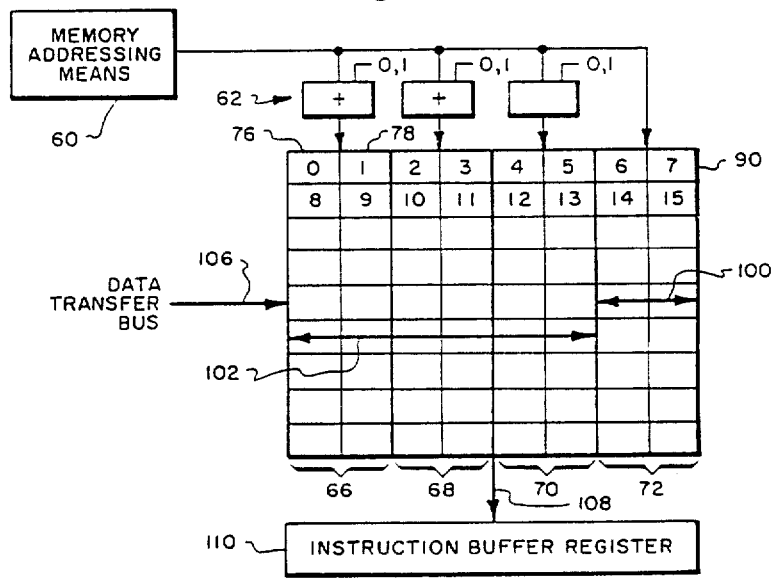
FIG. 3 is a pictorial representation of a memory addressing means and a programmed random access memory for reading out blocks of an instruction stream comprising a plurality of instruction segments stored at addressed selected locations in the memory means and for storing the instruction stream in the instruction buffer register.

FIG. 3 illustrates the operation of the memory addressing means in response to the instruction address of FIG. 2. The memory addressing signals from the memory addressing means 60 in FIG. 3 is a translated address signal which is derived from the instruction address stored in the instruction address register 26 in FIG. 1. The memory addressing means 60 applies its addressing signals through a plurality of gating means 62 which divides the memory 90 into four major column sections designated as 66, 68, 70 and 72. Each of the column sections is divided into subcolumn sections of which sections 76 and 78 are typical. A specific row information, shown generally as row 90, is addressed in coincidence with the column addressing such that blocks of the programmed random access memory 90 containing instruction segments at selected locations can be read out in parallel and stored in the instruction buffer register 110. A typical block of the instruction stream which can be read from a plurality of columns and rows to assemble a 128-bit block of the instruction stream is illustrated by arrows 100 and 102. In the preferred embodiment, each block of the instruction stream read from the programmable random access memory 90 is 128 bits in length such that the memory addressing means can "wrap around" a number of column/row blocks of locations which are preloaded by means of a data transfer bus 106. The stored information read from the memory 90 is transferred by a transferring means, illustrated by arrow 108, into the instruction buffer register 110.

Figure 4:
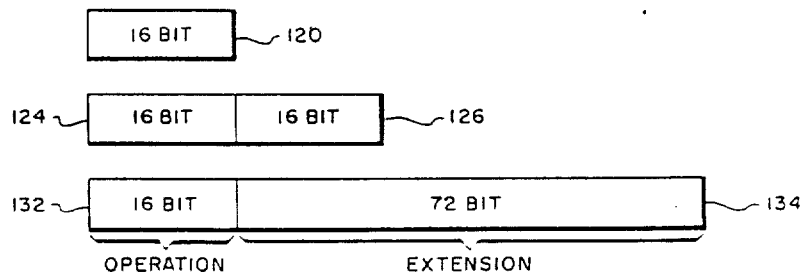
FIG. 4 is a pictorial representation of a format of an instruction segment, having an operation portion and an extension portion, which is capable of operating a predetermined one of a plurality of functional units which is generally referred to herein as the XY-machine instruction format.
Figure 9:
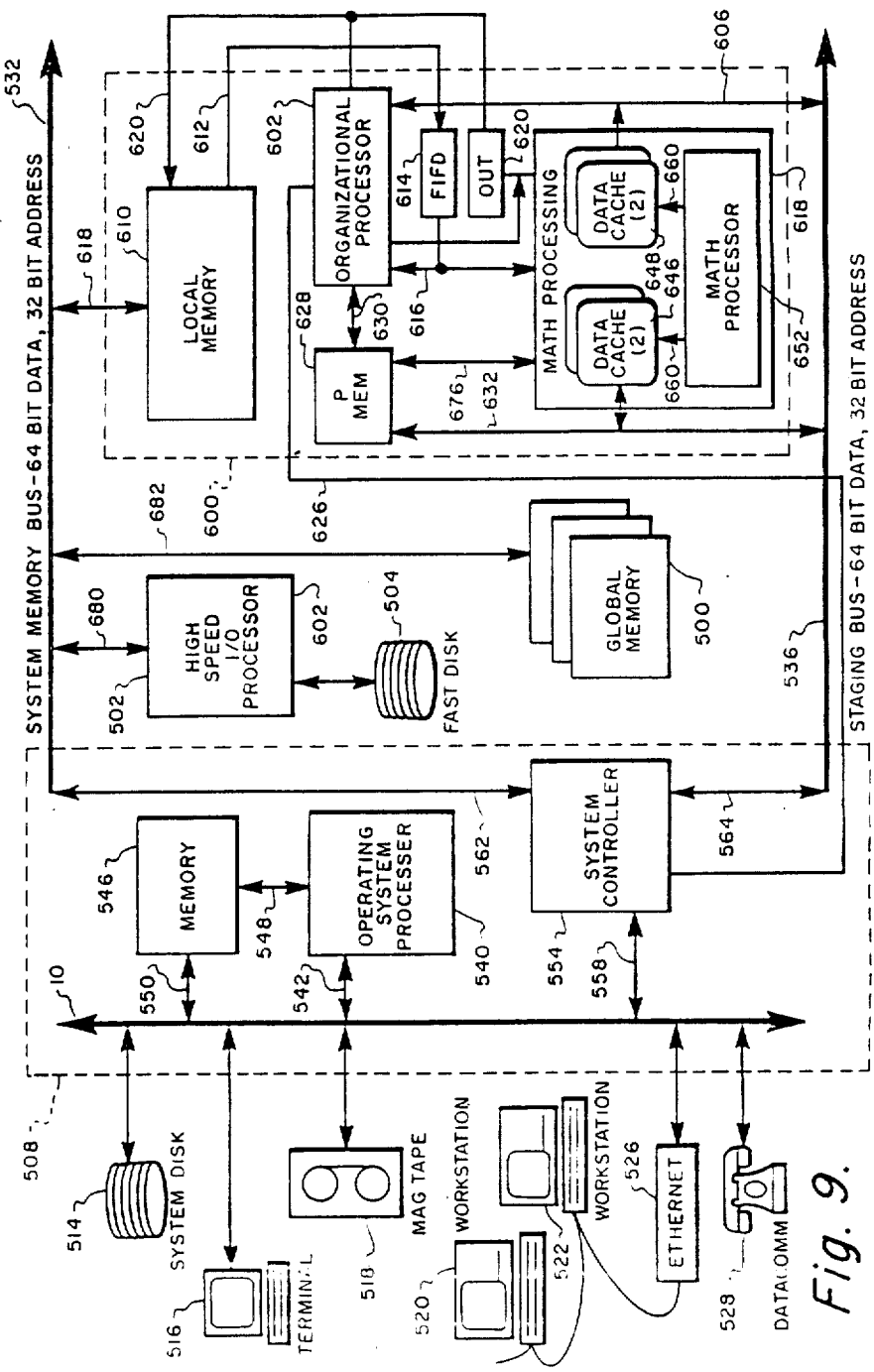
FIG. 9 is a block diagram of a typical application processor utilizing an instruction sequencer for controlling parallel operations of an XY machine and an A machine.

FIG. 4 illustrates that the instruction segment for the XY-machine instruction format can vary depending on whether it is directed to a predetermined one of the plurality of functional units such as, for example, the XY machine. Thus, XY-machine instruction format can comprise: (i) a single 16-bit operation portion alone, shown by instruction segment 120; (ii) a 16-bit operation portion designated by section 124 and a 16-bit extension portion designated by extension portion 126; or (iii) a 16-bit operation portion shown as 32 in combination with a 72-bit extension portion shown as 134. The XY-machine instruction format disclosed in FIG. 4 is the format utilized in the preferred embodiment of an application processor which is illustrated by FIG. 9 herein.

FIG. 5 illustrates the instruction segment format for another of the plurality of functional units which is referred to as the A machine. The A-machine instruction format illustrated in FIG. 5 can include a variety of operation portions and extension portions. For example, the A-machine format can include: (i) a 16-bit operation portion shown by a 16-bit instruction 140; (ii) a 16-bit operation portion shown generally as 142 and a 16-bit extension portion shown generally as 146; (iii) a 32-bit operation portion shown generally as 150; or (iv) a 32-bit operation portion, shown generally as 152 having a 16-bit extension 154.

The XY-machine instruction format illustrated in FIG. 4 and the A-machine instruction format illustrated in FIG. 5 can be combined in any order in the instruction stream.

FIG. 6(A) illustrates one exemplary section of an instruction stream which includes two successive instruction segments, shown generally as 160 and 162 for the XY machine only. The two instruction segments 160 and 162 within the instruction stream would be applied in successive clock cycles to the decoding means for the predetermined one of the plurality of functional units since the predetermined one of the plurality of functional units must execute an instruction segment 160 before it can execute the successive instruction segment 162. For example, this combination may be required where the XY machine could perform two simple calculations in two clock cycles wherein the A machine requires two clock cycles to receive numerical results from another processor before the A machine can proceed with its calculation.

FIG. 6(B) illustrates that the instruction stream can contain a leading instruction segment, shown generally as 170, which is designated to be an XY-machine instruction segment and a trailing instruction segment, shown generally as 172, which is an A-machine instruction segment. When the trailing instruction segment is different from the leading instruction segment, the instruction sequencer functions to enable both the A machine and the XY machine to be operated in parallel, as will be described in connection with FIG. 7 hereof.

FIG. 7 illustrates the operation of a multiunit instruction sequencer which is utilized by the application processor for producing from its program memory 204 an instruction stream required to control the A and XY machines. Typically, the address will be stored in an address register 200. When the address register 200 is clocked by the clocking means, the addressing signals are applied to a program transaction table 202 which address a specific location in the program memory 204. The program memory 204 contains instruction streams comprising 4–32 bit instructions which are stored in a 256KB program memory accessed 16 bytes at a time. The addressing signals cause a full 128-bit block of the instruction stream to be read out of the program memory 204, as illustrated by the shaded portion 206 in memory 204. The instruction stream represented by shaded portion 206 is transferred via transmission means 210 into a clocked instruction buffer 212. The instruction buffer 212 is required because each transfer of the instruction stream is in response to a single clock cycle. Thereafter, and in response to the next clock cycle, the instruction buffer 212 transfers the information it has stored therein via transmission means 214 into rotating network means 216 which preprocesses the instruction stream to place it into a certain format to determine whether or not any type of arithmetic operation is to be performed and, if so, which arithmetic processor, namely the XY machine or the A machine, is to perform that operation. In the preferred embodiment, the first bit of the instruction stream in the rotating network means 216 is sensed to determine whether an arithmetic process is required, and if not, that information is passed via connecting means 224 to a shift register 222 to indicate that no arithmetic operation is required. This would occur in the instruction segment sequence illustrated in FIG. 6(A).

If an arithmetic operation is required, the first bit of the instruction stream contained in rotating network means 216 is sampled to determine whether the arithmetic operation is required to be performed by the XY machine or the A machine. If the arithmetic calculation is to be executed by the XY machine, the appropriate instruction appears on output 230 which is applied to the decoding means for the XY machine or A machine, whichever is applicable.

If the instruction designates that an arithmetic operation is to be performed by the A machine, that information is sensed by the X instruction width detecting means 232 which causes the instruction to be transferred via communication means 234 to a left shift register 240 at the same time the information is passed to the XY machine for decoding by the rotating network means 216. The XY machine decoding produces an X or Y control signal to cause the X machine segment or the Y machine segment to execute the assigned arithmetic operation. Thereafter, the portion of the instruction which is applicable to the A machine is applied by output 242 to the A machine decoder which decodes that portion of the instruction stream to produce an A-machine control signal which causes the A machine to execute the assigned arithmetic operation.

The XY-machine instruction width detecting means 232 applies a signal to a total width determining means 236. The total width detecting means 236 advises the rotating network control means 218 that the instruction stream clocked out of the instruction buffer register 212 has been shifted and that the shifting means 240 is ready to be reloaded during a clock cycle.

Figure 8:
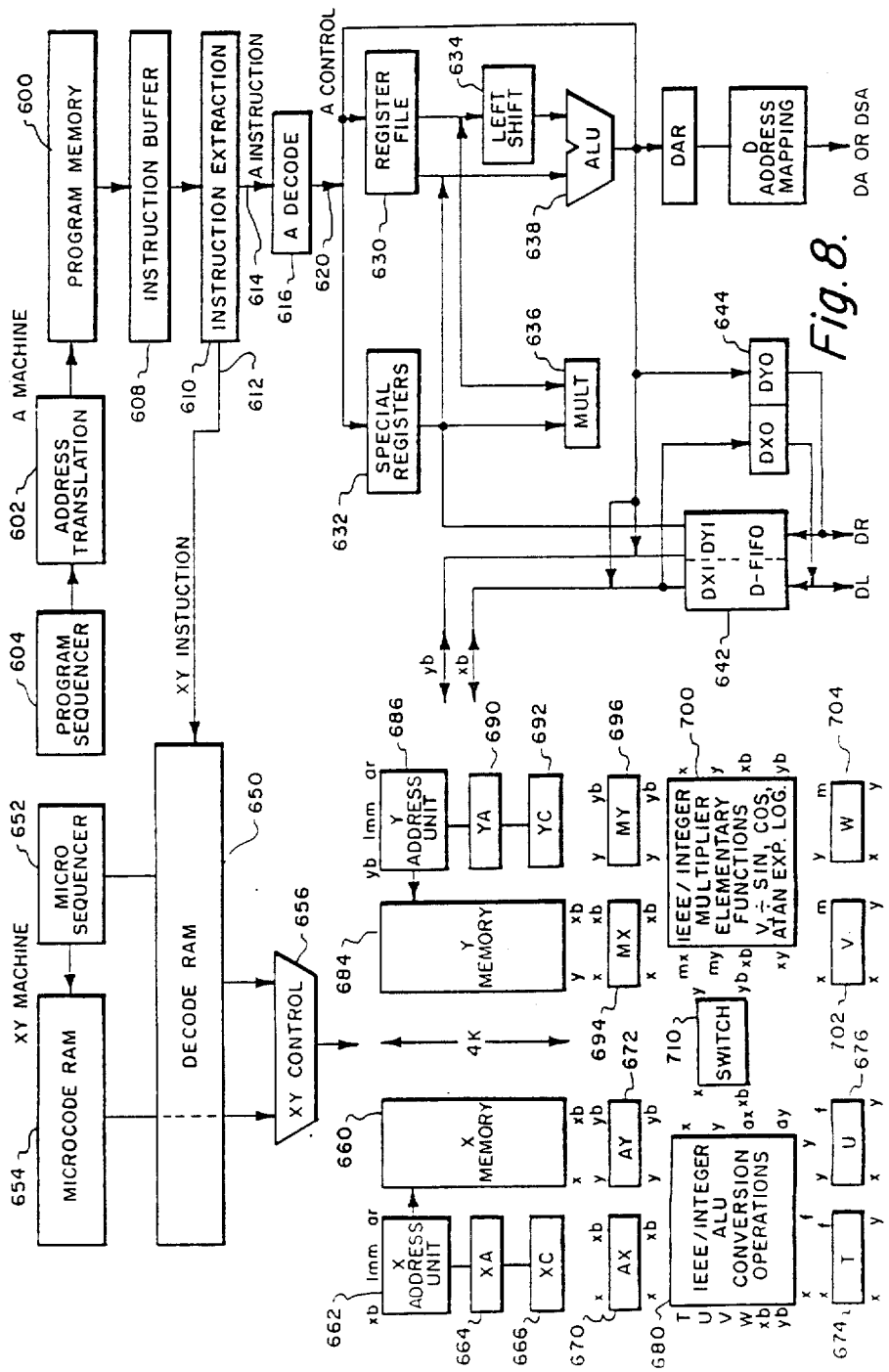
FIG. 8 is a logic diagram illustrating the various components of the XY machine which function as the math processor and an A machine which functions as the organizational processor, each of which is capable of performing arithmetic operations.

FIG. 8 is a logical block diagram illustrating the various components of the XY machine which function as a math processor and of the A machine which functions as the organized processor. Both the XY machine and A machine are capable of performing arithmetic operations.

The A machine includes a program memory 300 which receives an instruction stream produced by means of a program sequencer 304 which is responsive to addressing signals. The output of the program sequencer 304 is applied to an address translation unit 306 which provides the specific location in the program memory 300. The information contained in the program memory 300 at the location address derived by the address translation unit 306 is read out as an instruction stream into the instruction buffer 308. Instruction buffer 308 applies the specific instruction, in the form of a 96-bit length word, into an instruction extraction means 310. The instruction extraction means 310 produces two instructions as an output, an XY instruction as shown by arrow 312, and an A instruction as shown by arrow 314.

Continuing with the A machine instruction, the A machine instruction 314 is applied to an A decoder 316 which produces a control signal as an output, as illustrated by arrow 320. The output is applied to the remaining portion of the A machine, or organizational processor, which is capable of responding to the control signal to execute basic arithmetic functions such as shifts, logic operations (AND, OR, NOR, XOR, etc.), addition, subtraction, multiplications, and control function (e.g. Branch).

The A machine includes a register file 330 and a set of special registers 332 to provide the data upon which the arithmetic operation is to be performed, as designated by the A control 320. The output of register file 330 is applied to a left shift register 334, to a multiplication unit 336, or to an ALU (adder) unit 338. The output of the ALU 338 is returned to one of the A machine special registers.

In the alternative, if the results of the arithmetic operation performed by the organizational processor, or A machine, is to be utilized by the XY machine, the arithmetic results are applied to either of the XY Buses, XB or YB buses so that asynchronous transfer or relative movement of data can be obtained between the organizational processor A machine and the XY machine.

Referring now to the XY machine portion of FIG. 8, the XY instruction 312 is applied to a decode random access memory 350. If the XY instructions appearing on XY instruction input 312 contain a branch or subroutine component, that requirement is determined by a microsequencer 352 which, in turn, enables a microcode random access memory 354 to produce a microcoded instruction signal which is applied to the XY control 356. In any case, the decode random access memory 350 applies the decoded instruction during the first clock cycle to the XY control 356. The XY machine has two major segments with shared elements. The X machine segment includes a memory 360 which is responsive to an address unit 362 wherein data from registers 364 and 366 are loaded by the address unit 362 into the X memory 360. Also, the X machine segment two registers 370 and 372 which are adapted to store data read from the X memory 360. The X machine segment includes a simple or basic arithmetic processor shown generally as 380 which is capable of performing IEEE/INTEGER, ALU and conversion operations, the output of which is applied to output registers 374 and 376. The output of the registers 374 and 376 is applied to the output buffer register wherein the results of the arithmetic operations are transferred directly to the operational processor.

The Y machine segment includes a Y memory 384 which is controlled by Y address unit 386 which is capable of loading data from registers 390 and 392 into the Y memory. Information is read from the Y memory and is stored in registers 394 and 396. In a similar manner, the Y machine segment includes an arithmetic processor 400 which is capable of performing IEEE/INTEGER, multiplier, elementary functions, square root, divide, sine, cosine, A-tangent, exponential, logarithmic, and the like. The results of the arithmetic processor 400 are stored in registers 402 and 404.

Registers 370, 372, 394 and 396 are capable of having information from either the X machine segment or the Y machine segment gated therein under controlled gating transfers. In a similar manner, information stored in registers 374, 376, 402 and 404 can be gated therein from either the X machine segment or the Y machine segment, all as shown by the letter designations on the registers.

A switch 410 is located intermediate the XY machine and functions to control the gating of information into the various registers, as described above, or to control the gating of information into either the processor 380 of the X machine segment or the processor 400 of the Y machine segment.

FIG. 9 diagrammatically represents the integrated, multicomputer data processing system of the present invention having a global memory section 500, a high-speed input-output section 502 which is operatively connected to a fast disk 504, and a control section shown generally by dashed lines 508. The control section includes an input/output data transfer means 510 for system input and output. As illustrated in FIG. 9, the input/output data transfer means 510 is adapted to network or interact with a wide variety of state-of-the-art peripheral devices such as, for example, a system disk 514, a terminal 516, magnetic tape 518, a network of work stations 520 and 522 which are operatively connected through a networking system such as ETHERNET 526 to the input/output data transfer means 510, and data communications 528 which likewise are connected to the multibus 510.

The control section 508 includes a system data bus 532 and system staging bus 536, each of which is capable of transferring 64 bits of data and 32 bits of address.

The control section 508 further includes an operating system processor 540 which is operatively connected to the multibus 510 for input-output data transfer by a connecting means illustrated by arrow 542. Also, an operating system processor random access memory 546 is operatively connected to the operating system processor 540 through a connecting means illustrated by arrow 548. Also, the random access memory 546 is operatively connected to the input/outout data transfer means through a connecting means, as illustrated by arrow 550.

The control section 508 further includes a system controller 554 which operates under control of the operating system processor 540. The system controller 554 is operatively connected to the input/output data bus by a communication means which is represented by arrow 558 The operating system processor 540 controls the operation of the system controller 554 by means of execution signals and interrupt signals which are applied from the operating system processor 540 and connecting means 542 through the input/output data transfer means 510 and communication means 558 to the system controller 554. The system controller 554 is operatively coupled via connecting means illustrated by arrow 562 to the system memory bus 532 and is connected via a communication means illustrated by arrow 564 to the staging bus 536.

The integrated, multicomputer data processing system includes at least one application processor section illustrated by the dashed box 600 which is operatively connected between the system memory bus 532 and the staging bus 536. The user processor section 600 includes an organizational processor 602 having a random access local memory 210 and a math processor section 218. The random access local memory 610 is operatively connected to the organizational processor 602 by a connecting means evidenced by arrow 612, and a multistage first-in first-out (FIFO) buffer register 614. The FIFO buffer register 614 is connected both to the organizational processor 602 and to the math processor section 618 by a connecting means 616. In addition, the math processor section 618 is connected to the local memory 610 through a single-stage output register 620 and connecting means 622. In addition, the local memory 610 is operatively connected to the system memory bus 632 by a connecting means as evidenced by arrow 618. The organizational processor 602 is connected by a connecting means 626 to the system controller 554.

The user processor 600 includes a program memory 628 which is operatively coupled to the organizational processor 602 by a connecting means shown by arrow 630. The program memory (sometimes referred to as the "P Memory") 628 is also operatively connected to the staging bus 536 via a connecting means represented by arrow 632. The staging bus 536 loads the data caches 646 and 648 via connecting means 632 and 606 respectively.

The user processor section 218 includes two sets of dual data cache memories 646 and 648. In addition, the math processing section 640 includes a math processor 652 having a plurality of connecting means, shown generally as 660, which interconnects each of the two sets of dual data caches 646 and 648 to the math processor 652, such that data can be transferred therebetween. The data caches 646 of the math processor section 618 and the P memory 628 are likewise connected to the staging bus 536 by connecting means illustrated by arrow 632.

Data transfer from the local memory 610 to the organizational processor 602 occurs over connecting means 632 and an input buffering means such as the FIFO buffering register 614. Data transfer from the math processor section 618 occurs through the output means 620, which in the preferred embodiment is in the form of a single stage, clocked output register which is capable of transferring numeric results from the math processing section 618 to the output register 620 in one clock cycle. The output register 620 transfers the same to the local memory 610 for further processing. The communication between the local memory 610 and the organizational processor 602 is in the form of an asynchronous transfer of data and, in the preferred embodiment, utilizes a three-stage, first-in-first-out buffer register as an input buffering means 614. In addition, the math processing 618 is operatively connected to the P memory 628 by connecting means illustrated by arrow 676. The organizational processor 602 has direct communication to the math processor section 618 over communication means 616 which permits data transfer therebetween without going through a register.

In operation, the organizational processor functions to keep a number of instructions ready for the math processor such that an instruction can be immediately loaded into the math processor together with the applicable data. The organizational processor loads the instructions and data as the performed arithmetic operation just completed by the math processor is loaded into the local memory.

The operating system processor 540 controls operation of the integrated, multicomputer data processing system by means of the input/output data transfer 510 which interfaces with the input-output devices 514 through 528, and which applies interrupt and execution signals to the system controller 554 to control overall system operation. The system controller, in turn, controls the organizational processor 602 via communication means 626. The system controller 554 under control of the operating system processor 540 functions to load data from the system memory bus 132 into the user processor 600. The staging bus 536 loads the user processor 600 with data and instructions concerning the programmed arithmetic operations. The user processor 600 is able to communicate over the system memory bus 532 with the high-speed input-output processor 502 by a connecting means shown generally by arrow 680. Similarly, the user processor 600 can communicate with the global memory 500 by means of the system memory bus 532 and a connecting means illustrated by arrow 682.

As is evidenced from the pictorial representation in FIG. 9, the integrated, multicomputer data processing system is modular in design and can have additional application processor sections added thereon to increase both MIPS and MFLOP operating rates of the data processing system.

In FIG. 9, the operating system processor 540 including its random access memory 546, operates to schedule and assign task and command signals through the system controller 554 over the system data bus 532 and the staging bus 536 to each user processor. Information is available to the operating system processor from any of the peripheral devices 514, 516, 518, 520, 522, 526 or 528 by means of the input/output data transfer means 510. The input/output data transfer means 510 also is capable of loading information directly into or receiving information from the random access memory 546 and from the operating system processor 540. The operating system processor 540 via the connecting means 542, input/output data transfer means 510, and connecting means 558 schedules and assigns tasks to each user processor independently through systems controller 554. The operating system processor 540 generates interrupt signals and execution signals for controlling system operations and also, through systems controller 554, controls operation of the high-speed input-output processor 502, including the fast disk 504 and the global memory 500.

In the preferred embodiment, the operating system processor 540 is generally referred to as a Kernal Processor. In one application, the operating system processor comprises a Sun 2 68010 processor/memory board with two megabytes of memory and an attached multibus for system I/O. The Kernal Processor runs a Berkeley version 4.2 bsd UNIX operating system. When the operating processor 540 desires to initiate a task in another processor, the operating system processor 540 fills out a task control block specifying the task, its size and bytes, its starting address and memory, together with additional information. The operating system processor 540 then commands the system controller 554 to load the task into the user processor, such as user processor 600, followed by a later order to the user processor 600 to begin executing the task.

The system controller 554 is a special block transfer device which loads the user processors 600 (and up to a total of four parallel application processors) with tasks to be executed based upon commands from the operating system processor 540. In essence, the system controller 554 operates directly under control of the operating system processor 540. The system controller 554 performs two specific functions, namely: (1) Transfer of data between a user processor and common data memory; and (2) support of input/output data transfer means and input/output devices to and from common memory. In the embodiment illustrated in FIG. 9, the user processor 600 has a large program cache 628 which has a capacity in the order of 256 KB. Also, the user processor 600 includes duplicated context switching facilities which permit the user processor 600 to execute one task while the system controller 554 is removing the last executed task from the user processor or is loading the next application task into the user processor. Thus, the system controller 554 performs the function of saving the information in commom data memory and later fetching the same from storage on disk. The system controller 554 functions to keep the user processor 600 operating at maximum efficiency by minimizing waiting time experienced by the user processor 600 waiting to receive a new task or transferring data during the various staging processes. Also, the system controller 554 functions to enable the user processor 600, or any other user processors operatively connected to the system, to operate independently at maximum efficiency.

As illustrated in FIG. 9, the user processor section 600 includes a random access memory 610 and a buffering means 674, in the form of a first-in-first-out buffer register, for enabling programmed, asynchronous transfer of numerical results between organizational processors 662 of the user processor section 600 and the random access memory means 610. The organizational processor 602 includes means which are responsive to an instruction stream reach out from the instruction cache 628 in response to the instruction address. A certain portion of the instruction stream relates to the math processor 652 and the applicable portion of the instruction stream is decoded to produce control signals which are used to control machine segments having shared elements of the math processor to execute selected mathematic operations on the data signals transferred to the user processor section 600.

The preferred embodiment of the instruction sequencer described herein is for operating two functional units of a plurality of functional units in parallel. However, it is readily apparent that three or more functional units could be operated in parallel by providing additional shifting networks which are responsive to the preceding shifting network and responsive to a control means which determines the width of each of the leading instruction segments such that the instruction format for each of the functional units is included within the instruction stream. In implementing a multiunit instruction sequencer, two or more shifting means, one for each additional functional unit, would be required to continually shift the instruction stream in order to position an instruction segment which is ultimately to be decoded in a predetermined one of the shifting means. If all of the number of functional units being controlled cannot be programmed with a control signal during a single clock cycle, a timing problem may exist. If the time required for the shifting and decoding for all of the functional units is greater than the clock cycle, a separate intermediate register can be interposed at an appropriate location in the instruction sequencer such that some of the control signals derived from a multiple shifted, rotated instruction stream can be loaded into the intermediate register which is capable of being clocked by a subsequent clocking cycle to permit further shifting and/or further decoding of the instruction stream in order to ultimately decode all of the instruction segments and store appropriate control signals into control registers to enable execution of data by the appropriate functional unit in response to its stored control signal.

In the preferred embodiment, the basic machine cycle time of the application processor is 143 nanoseconds, which is based upon a 7-megahertz clock frequency.

The instruction sequencer can be utilized in an integrated multicomputer data processing system which is utilized for high-speed vector and nonvector calculations or a combination thereof.

The integrated, multicomputer data processing system is well designed for higher mathematics applications like simulation, signal processing, image processing, and the like. The scientific user or an intelligent compile how to convert mathematical constructs like Fast Fourier Transforms (FFT), convolutions, function evaluations, and numerical integrations into a complex series of add/subtract/shift/multiply/divide instructions, with other operations like trig functions, square roots, and the like, processed by elaborate floating point subroutines.

The integrated, multicomputer data processing system described herein uses the following processing methods for higher mathematics applications:

| ITEM | MATH FUNCTION | METHOD | APPLICATION PROCESSOR CAPABILITY |
|---|---|---|---|
| 1 | Linear Equations | Dot Product | Simultaneous add & |
| 2 | Convolutions | Dot Product | multiply (Floating point or integer) Single cycle execution of integer and single precision floating point operations |
|   |   | SAXPY/DAXPY | Three independently addressable memories (2 data caches and main memory) |
| 3 | Function Evaluation | Polynomial Evaluation | Perform an add and initiate a multiply with the sum Microcoded Newton method with ROM loaded start point |
|   |   | Iterative Methods | Special exponent processing hardware |
| 4 | Numerical Integration | Function Evaluation | Microcoded FORTRAN Intrinsic |
|   |   | Dot Product | See above |
| 5 | Fast Fourier Transform | Butterfly | Single precision trig tables in ROM Bit Reverse addressing of array memories Simultaneous add & multiply |

An example of how the application processor executes a Fast Fourier Series, it is common to run across the treatment of Fourier Series, it is common to rund across the following calculations:

$$x' = \Sigma(x + y), \text{ and } Y' = (x - \Delta y),$$
$$\text{where } \Delta y = (\cos\theta + i\sin\theta)(y_1 + iy_2)$$
$$= [(y_1\cos\theta - y_2\sin\theta) + i(y_1\sin\theta + y_2\cos\theta)]$$

The above calculation is to be repeated and the results thereof summed for "n" iterations. In this example, the more iterations made by the application processor, the greater the accuracy of the results of the calculation.

In this example, each pass would require four multiply operations and six additions (comprising adding the two numbers in each of two sets of parentheses, plus the cumulative summing of x' and y' results at the end of each pass).

The user processor has a table of single precision floating point trigonometric values in ROM, each 4K entries long. A request for a sine or cosine value is a simple fetch from fast cache which can be performed without any waiting time for a cycle. The user processor performs simultaneous adds and multiplies via the simple math processor and complex math processor. Thus, the six adds and four multiplies only take six cycles, for a total of approximately 14 cycles per pass. Thus, the application processor would operate at 4.99 MFLOPS calculated as follows: 14 cycles × 143 ns/cycle = 2002 ns/pass, and 499,000 passes/sec, each pass with 10 operations.

The integrated, multicomputer data processing system architecture, operating system and compiler operations are designed such that there is a mixture of vector and non-vector operations to be processed. The application processor actually operates as a high-speed processor due to the compiler's ability to rearrange the processing task to capitalize on more parallel opportunities in the function being calculated without any degradation in performance due to the mix of operations.

Depending upon the data processing system architecture, it is readily apparent that a plurality of parallel application processors could each have its own dedicated multiunit instruction sequencer enabling parallel operations of multiunit instruction sequencers from separate instruction streams loaded into each parallel application processor.

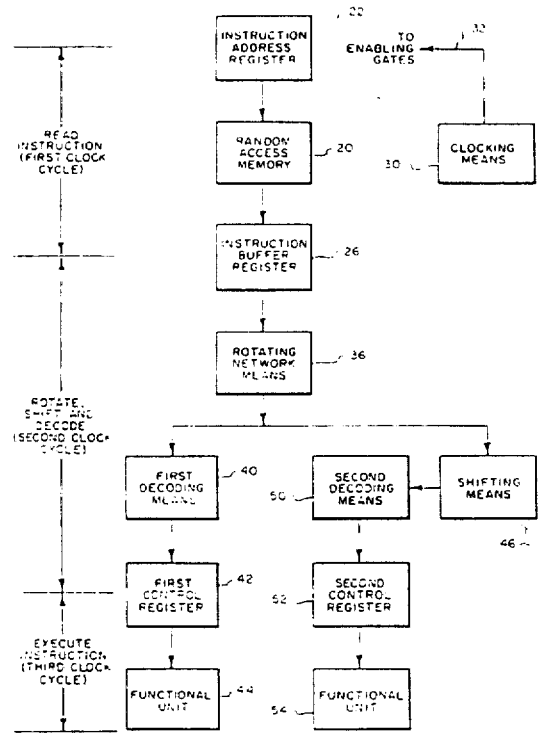

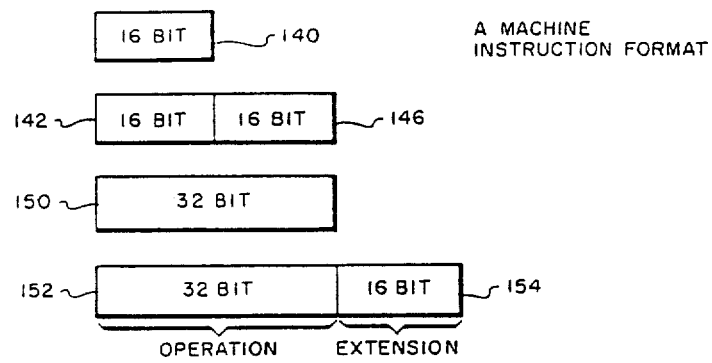
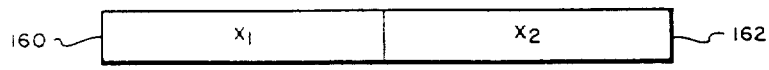
Fig. 6A.
Fig. 6B.
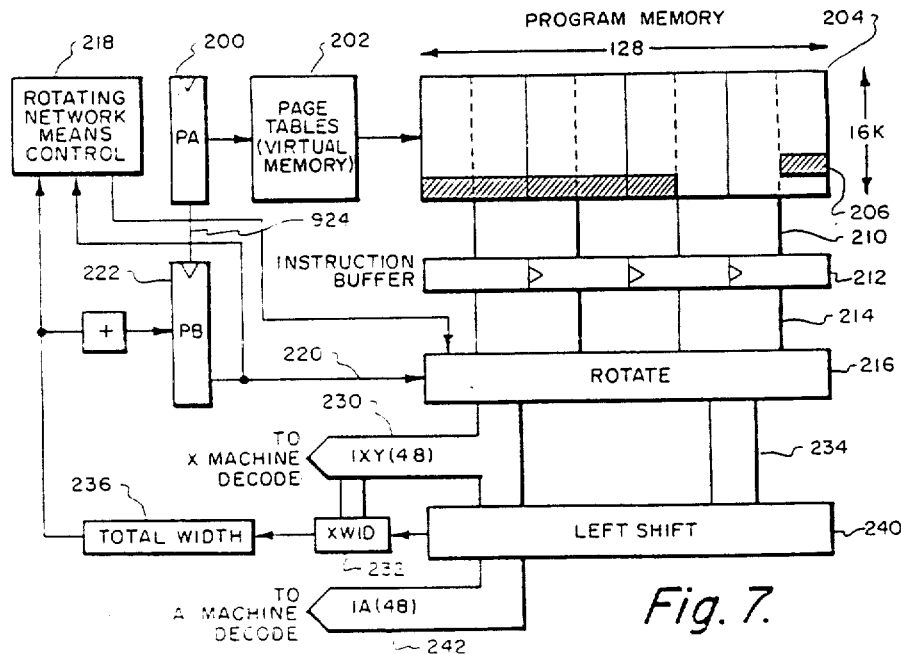

What is claimed is:

1. An instruction sequencer for programming parallel operations of a plurality of functional units in response to an instruction stream comprising memory means for storing in selected locations in said memory means a plurality of instruction segments for programming operations of at least two of said plurality of functional units;

an instruction address register adapted to be loaded with instruction addresses for selected locations in said memory means;

memory addressing means operatively coupled to said memory means and said instruction address register and responsive to instruction addresses loaded in said address registers for reading out instruction segments from addressed selected locations in said memory means in an instruction stream comprising instruction segments which include a selected instruction segment for programming operation of at least a predetermined one of said plurality of functional units;

an instruction buffer register operatively coupled to said memory means for storing said instruction stream from said memory means;

a rotating network means operatively coupled to said instruction buffer register for rotating said instruction stream to position a selected instruction segment thereof at a predetermined location in said rotating network means, said rotating network means including output means for transfering as an output therefrom the rotated instruction stream;

control means including a staging register adapted to be loaded with an address designating the location of said selected instruction segment in the instruction stream and means for determining the width of said selected instruction segment, said control means being operatively coupled to said instruction buffer register and to said rotating network means for enabling said rotating network means to be responsive to said staging register to rotate said instruction stream to position said selected instruction segment at said predetermined location in said rotating network means;

a first decoding means operatively coupled to said rotating network means output means for decoding said selected instruction segment to produce a first control signal which is capable of commencing operation of said predetermined one of said plurality of functional units;

a shifting means operatively coupled to said rotating network means output means and to said control means for enabling said shifting means to shift said rotated instruction stream at least the width of said selected instruction segment to position the beginning of a successive instruction segment for another of said plurality of functional units at a predetermined location within said shifting means; and a second decoding means operatively coupled to said shifting means for decoding said shifted rotated instruction stream to produce a second control signal which is capable of commencing operation of said another of said plurality of functional units in parallel with the operation of said predetermined one of said plurality of functional units.

2. The instruction sequencer of claim 1 further comprising instruction addressing translating means operatively coupled between said instruction address register and said memory addressing means for translating said instruction addresses into addressing signals which are applied to said memory addressing means.

3. The instruction sequencer of claim 1 further comprising a first control register for storing said first control signal for said predetermined one of said plurality of functional units; and a second control register for storing said second control signal for said another of said plurality of functional units.

4. The instruction sequencer of claim 3 further comprising a clocking means operatively coupled to said instruction address register, said instruction buffer register and said first and second control registers for gating in a first clock cycle execution of the instruction address stored in said instruction address register to read out said instruction stream from said memory means and load the same in said instruction buffer register and for gating in a second clock cycle the rotating of said instruction stream in said rotating network means and the decoding by said first decoding means of the selected instruction segment to produce said first control signal which is stored in said first control register and the shifting of said rotated instruction stream in said shifting means and the decoding of said shifted rotated instruction stream by said second decoding means to produce said second control signal which is stored in second control register.

5. The instruction sequencer of claim 4 wherein said clocking means gates in parallel application of the first control signal stored in said first control register to said predetermined one of the plurality of functional units and application of the second control signal stored in said second control register to said another of the plurality of functional units.

6. The instruction sequencer of claim 4 wherein said control means includes a staging register for storing a portion of the instruction address associated with the location where said selected instruction segment was stored in said memory means to identify the location of the start of the selected instruction segment stored in said instruction buffer register.

7. The instruction sequencer of claim 6 wherein said control means further includes a shift control means for producing and applying to said shifting means an enabling signal which shifts said rotated instruction stream an amount equal to the bit width of the selected instruction segment resulting in the shifted rotated instruction stream bit length being equal to the total bit width of the instruction stream reduced by the bit width of said selected instruction segment.

8. The instruction sequencer of claim 7 wherein said control means further includes a rotating network control means operatively coupled to said staging register and said shift control means for producing and applying to said rotating network means a rotating control signal which gates and rotates the instruction stream as it is being loaded from said instruction buffer register into the rotating network means.

9. The instruction sequencer of claim 7 wherein said control means further includes means for updating the address stored in said staging register for a subsequent clock cycle.

10. A method for programming parallel operations of a plurality of functional units in response to an instruction stream comprising the steps of storing in selected locations in a memory means a plurality of instruction segments for programming operations of at least two of said plurality of functional units;

loading into an instruction register instruction addresses for selected locations in said memory means;

reading out of said memory means with a memory addressing means instruction segments from addressed selected locations in the memory means in an instruction stream comprising segments which include a selected instruction segment for programming operation of at least a predetermined one of said plurality of functional units;

storing in an instruction buffer register the instruction stream received from said memory means;

rotating with a rotating network means the instruction stream to position a selected instruction segment thereof at a predetermined location in said rotating network means;

determining with a control means the location of a selected instruction segment in the instruction stream and for determining the width of said selected instruction segment, said control means enabling said rotating network means to rotate said instruction stream to position said selected instruction segment at said predetermined location in said rotating network means;

decoding with a first decoding means said selected instruction segment to produce a first control signal which is capable of commencing operation of said predetermined one of said plurality of functional units;

shifting with a shifting means the rotated instruction stream at least the width of said selected instruction segment to position the beginning of a successive instruction segment for another of said plurality of functional units at a predetermined location within the shifting means; and decoding with a second decoding means said shifted rotated instruction stream to produce a second control signal which is capable of commencing operations of said another of said plurality of functional units in parallel with the operation of said predetermined one of said plurality of said plurality of functional units.

11. The instruction sequencer of claim 10 further comprising the steps of translating the instruction addresses stored in the instruction address register; and applying the translated instruction addresses to a memory addressing means which is capable of addressing said memory means.

12. The method of claim 10 further comprising the steps of storing in a first control register said first control signal for said predetermined one of said plurality of functional units; and storing in a second control register said second control signal for said another of said plurality of functional units.

13. The instruction sequencer of claim 12 further comprising the steps of clocking with a clocking means said instruction buffer register and said first and second control registers for gating in a first clock cycle execution of the instruction address stored in said instruction address register to read out said instruction stream from said memory means and for loading the same in said instruction buffer register and for gating in a second clock cycle the rotating of said instruction stream in said rotating network means and decoding with said first decoding means said selected instruction segment to produce said first control signal which is stored in said first control register and shifting of said rotated instruction stream in said shifting means and the decoding of said shifted, rotated instruction stream by said second decoding means to produce said second control signal which is stored in said second control register.

14. The method of claim 13 further comprising the step of clocking with said clocking means parallel application of the first control signal stored in said first control register to said predetermined one of the plurality of functional units and the application of the second control signal stored in said second control register to said another of the plurality of functional units.

15. The method of claim 13 comprising the steps of storing in a staging register a portion of the instruction address associated with the location where said selected instruction segment was stored in said memory means for identifying the location of the start of said selected instruction segment stored in the instruction buffer register.

16. The method of claim 13 comprising the step of producing and applying to said shifting means an enabling signal which shifts said rotated instruction stream in an amount equal to the bit width of the selected instruction segment, resulting in the shifted rotated instruction stream bit length being equal to the total bit width of the instruction stream reduced by the bit width of said selected instruction segment.

17. The method of claim 13 further comprising the steps of producing and applying to said rotating network means a rotating control signal which gates and rotates the instruction stream as it is being loaded from said instruction buffer register into the rotating netword means.

18. The method of claim 13 further comprising the steps of updating the address stored in said staging register for a subsequent clock cycle.

19. A multiunit instruction sequencer which is responsive to an instruction stream for programming parallel operations of at least two functional units comprising memory means including a memory addressing means for storing in selected locations in said memory a plurality of instruction segments for programming operations of at least two of said plurality of functional units;

an instruction buffer register operatively coupled to said memory means for storing said instruction stream from said memory means;

a rotating network means operatively coupled to said instruction buffer register for rotating said instruction stream to position a selected instruction segment thereof at a predetermined location in said rotating network means;

control means including means for determining the location of said selected instruction segment and the width thereof in the instruction stream and for enabling said rotating network means to rotate said instruction stream to position said selected instruction segment at said predtermined location in said rotating network means;

shifting means operatively coupled to said rotating network output means and to said control means for enabling said shifting means to shift said rotated instruction stream at least the width of said selected instruction segment to position the beginning of a successive instruction segment for another of said plurality of said functional units at a predetermined location within said shifting means; and decoding means operatively coupled to said rotating network means and to said shifting means for receiving at least one of said selected instruction segment and said successive instruction segment for decoding the same to produce control signals which are capable of commencing operation of at least one of said predetermined one end and said another of said plurality of functional units in parallel.

20. The multiunit instruction sequencer of claim 19 further comprising
first and second control registers operatively coupled to said decoding means to store said control signals.

* * * * *

UNITED STATES PATENT AND TRADEMARK OFFICE
CERTIFICATE OF CORRECTION

PATENT NO. : 4,837,678
DATED : June 6, 1989
INVENTOR(S) : Glen J. Culler, et al

It is certified that error appears in the above—identified patent and that said Letters Patent is hereby corrected as shown below:

Delete Figures 1-4 as printed

Substitute attached Figures 1-9

Signed and Sealed this

Eighth Day of May, 1990

Attest:

HARRY F. MANBECK, JR.

Attesting Officer

Commissioner of Patents and Trademarks

United States Patent [19]
Culler et al.

[11] Patent Number: 4,837,678
[45] Date of Patent: Jun. 6, 1989

[54] INSTRUCTION SEQUENCER FOR PARALLEL OPERATION OF FUNCTIONAL UNITS

[76] Inventors: Glen J. Culler, 608 Litchfield, Santa Barbara, Calif. 93105; Robert B. Pearson, 6457 Camino Viviente, Goleta, Calif. 93117; Michael McCammon, 683 Catania Way, Santa Barbara, Calif. 93105; William L. Proctor, 6641 Del Playa, Goleta, Calif. 93117; John L. Richardson, 5561 Huntington Dr., Santa Barbara, Calif. 93111

[21] Appl. No.: 35,349
[22] Filed: Apr. 7, 1987
[51] Int. Cl.⁴ .................................................. G06F 9/22
[52] U.S. Cl. ..................................................... 364/200
[58] Field of Search ... 364/200 MS File, 900 MS File
[56] References Cited

U.S. PATENT DOCUMENTS

| | | | |
|---|---|---|---|
| 3,234,523 | 2/1966 | Blixt et al. | 364/200 |
| 3,346,851 | 10/1967 | Thornton et al. | 364/200 |
| 3,771,141 | 11/1973 | Culler | 364/200 |
| 4,051,551 | 9/1977 | Lawrie | 364/200 |
| 4,287,566 | 9/1981 | Culler | 364/200 |
| 4,541,048 | 9/1985 | Propster et al. | 364/200 |
| 4,604,695 | 8/1986 | Wider et al. | 364/200 |
| 4,722,049 | 1/1988 | Lahti | 364/200 |

*Primary Examiner*—David Y. Eng
*Attorney, Agent, or Firm*—Freilich, Hornbaker, Rosen & Fernandez

[57] ABSTRACT

An instruction sequencer for programming parallel operations of functional units in response to an instruction stream is shown. The instruction sequencer includes a random access memory for storing instruction segments which program the operations of the functional units. An instruction address register contains instruction addresses for selected locations in the memory having instruction segments stored therein. A memory address circuit reads out an instruction stream comprising instruction segments from the memory in response to the stored instruction address and stores the same in an instruction buffer register. A rotating network, which is operatively coupled to the instruction buffer register, rotates the instruction stream so as to position a selected instruction segment at a predetermined location in a rotating network. A control circuit determines whether the rotating network is required to rotate the instruction stream and, if so, directs the rotating network to position the selected instruction segment at the predetermined location in the rotating network. A first decoding circuit receives and decodes the selected instruction segment to produce a first control signal. A shifting circuit receives the rotated instruction stream and shifts the same an amount equal to at least the width of the selected instruction segment and then applies the same to a second decoding circuit which produces a second control signal. The first and second control signals are adapted to be applied to and commence operation of the functional units in parallel.

20 Claims, 2 Drawing Sheets